Jan. 14, 1964  M. A. DIONNE  3,117,801
SNUBBING CABLE FOR VEHICLE REAR AXLES
Filed Nov. 16, 1962

INVENTOR.
MARC A. DIONNE

3,117,801
SNUBBING CABLE FOR VEHICLE REAR AXLES
Marc A. Dionne, 78 Hamilton St., Hartford, Conn.
Filed Nov. 16, 1962, Ser. No. 238,214
5 Claims. (Cl. 280—150)

This invention relates to mechanical compensation devices and more particularly to a snubbing cable for automotive vehicles.

It is an object of the present invention to provide a snubbing cable which will prevent having to raise the body of an automobile excessively off the ground to change a tire.

Another object of the present invention is to provide a snubbing cable that when attached to the automobile's frame and axle and adjusted it will be no longer necessary to touch it.

A further object of the present invention is to provide a snubbing cable which will eliminate the considerable overhang present between the rear axle and the rear bumper of automobiles.

Other objects of the invention are to provide a snubbing cable bearing the above objects in mind which is of simple construction, has a minimum number of parts, is inexpensive to manufacture and efficient in operation.

Figure 1:
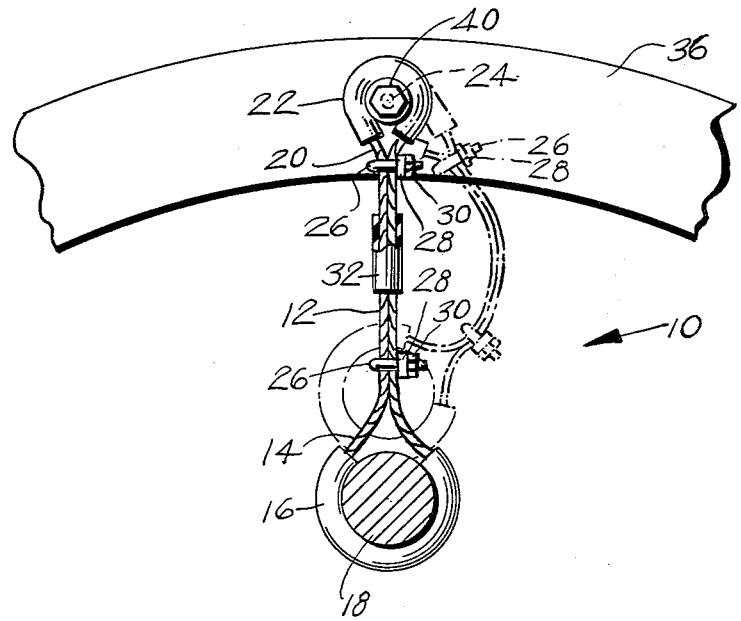
Figure 2:
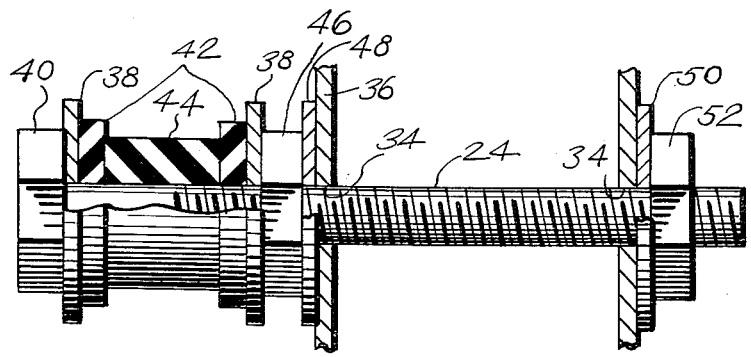

For other objects and for a better understanding of the invention, reference may be had to the following detailed description taken in conjunction with the accompanying drawing, in which:

FIGURE 1 is a front view of the present invention showing the normal position in phantom lines; and FIGURE 2 is an enlarged horizontal view of the mounting means shown in FIGURE 1.

Referring now more in detail to the drawing, a snubbing cable 10 made in accordance with the present invention is shown to include a standard steel cable 12 having a large loop 14 at its lower end. Loop 14 is covered with rubber tubing 16 and is received around axle 18. A smaller loop 20 at the upper end of cable 12 is provided with rubber tubing 22 and is received around threaded bolt 24. A pair of spaced apart U-shaped configurated fasteners 26 freely receive spacers 28 and threaded nuts 30. Fasteners 26 provide a means for securing the two parts of cable 12 together and a short section of tubing 32 freely and slidably receives cable 12 below loop 20. The threaded bolt 24 is freely and slidably received within circular openings 34 of frame 36 of the vehicle and a pair of spaced apart steel washers 38 are freely received on bolt 24 behind its head 40. A pair of spaced apart rubber washers 42 are received on bolt 24 between washers 38 and a rubber sleeve 44 is received on bolt 24 between washers 42 and provide support means for loop 20 of cable 12. A nut 46 is threadingly received on bolt 24 and abuts against one of the washers 38 from one side and a washer 48 is received on bolt 24 and abuts against the other side of nut 46. Frame 36 abuts against washer 48 on one side and washer 50 on the other side which is received freely upon threaded bolt 24 and a locking nut 52 is threadingly received on the end of bolt 24 against washer 50.

In operation, U bolt fasteners 26 are tightened after cable 12 is adjusted to proper length to decrease the large overhang between the rear axle 18 and the bumper of the vehicle and when fasteners 26 are tightened by rotating nuts 32 against spacer 28 cable 12 remains secured at the proper length thus supporting axle 18 when the vehicle is jacked up to replace a tire.

While various changes may be made in the detail construction it shall be understood that such changes shall be within the spirit and scope of the present invention as defined by the appended claims.

What I claim as new and desire to protect by Letters Patent of the United States is:

1. A snubbing cable of the class described for an automobile having a frame, comprising, in combination, a length of flexible cable looped at each end to provide an upper loop and a lower loop, a substantially U-shaped fastener embracing the adjacent cable portions near each loop, a substantially elongated and substantially rectangular spacer and nut fasteners received on the free ends of each of the respective U-shaped fasteners and thereby clamping said cable portions together, an elongated threaded bolt secured to the automobile frame portion above the rear axle for suspending the upper loop of said cable from the frame, a hollow rubber sleeve carried by the free end of said bolt providing shock and anti-chafe means for said upper loop, each said cable loop being covered with rubber tubing, said lower cable loop being received around the rear axle of said automobile and said upper cable loop being received around said bolt sleeve to support the axle upon jacking the automobile whereby the height of the automobile need be raised to replace a tire thereon is appreciably reduced.

2. A combination according to claim 1, wherein said threaded bolt is slidably received through a pair of substantially circular openings in said frame of said vehicle and a nut is threadingly received on the end of said bolt on the inner side of said frame of said vehicle, for securing said bolt and cable to said frame of said vehicle.

3. A combination according to claim 2, wherein a washer is received between said frame and said nut securing said bolt to said frame and another metal washer is received by said bolt on the opposite side of said frame and abuts against a spacer nut and a pair of spaced apart metal washers are in abutment with the head of said bolt and said spaced nut received by said bolt.

4. A combination according to claim 3, wherein a pair of spaced apart rubber washers is received upon said threaded bolt between said spaced apart metal washers between said nut and said spacer nut on said bolt and said rubber sleeve supporting said cable is received around the outer periphery of said bolt and the ends of said sleeve are in abutment with said rubber washers.

5. A combination according to claim 1, wherein said snubbing cable has a rubber sleeve between said U-shaped fasteners further preventing chafing against an object and said cable is adjustable by loosening said nuts on said U-shaped fasteners and shortening and lengthening said cable after which said nuts are tightened upon said U-shaped fasteners thus securing said cable at a suitable length.

References Cited in the file of this patent

UNITED STATES PATENTS

| | | |
|---|---|---|
| 862,840 | Nelson et al. | Aug. 6, 1907 |
| 1,421,781 | Holmes | July 4, 1922 |
| 2,454,996 | Dahleen | Nov. 30, 1948 |
| 2,912,198 | Feil | Nov. 10, 1959 |